(12) United States Patent  (10) Patent No.: US 9,542,584 B2
Gannon  (45) Date of Patent: *Jan. 10, 2017

(54) HANDHELD INDICIA READER HAVING LOCKING ENDCAP

(71) Applicant: Hand Held Products, Inc., Fort Mill, SC (US)

(72) Inventor: Colleen P. Gannon, Marcellus, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/933,300

(22) Filed: Nov. 5, 2015

(65) Prior Publication Data

US 2016/0055362 A1    Feb. 25, 2016

Related U.S. Application Data

(63) Continuation of application No. 14/520,707, filed on Oct. 22, 2014, now Pat. No. 9,183,426, which is a continuation of application No. 14/023,762, filed on Sep. 11, 2013, now Pat. No. 8,870,074.

(51) Int. Cl.
  *G06K 7/10* (2006.01)
  *H01M 2/00* (2006.01)
  *H01M 2/10* (2006.01)

(52) U.S. Cl.
  CPC ............ *G06K 7/10881* (2013.01); *H01M 2/00* (2013.01); *H01M 2/1066* (2013.01)

(58) Field of Classification Search
  CPC .............................. G06K 7/10881; H01M 2/00
  USPC ................ 235/435, 454, 462.43, 462.45, 235/472.01–472.03
  See application file for complete search history.

(56) References Cited

U.S. PATENT DOCUMENTS 8,870,074 B1* 10/2014 Gannon ............. G06K 7/10881
                                                  235/472.01
9,183,426 B2* 11/2015 Gannon ............. G06K 7/10881

* cited by examiner

*Primary Examiner* — Seung Lee
(74) *Attorney, Agent, or Firm* — Additon, Higgins, & Pendleton, P.A.

(57) ABSTRACT

An indicia-reading device including an indicia-capturing subsystem for acquiring information about indicia within the indicia-capturing subsystem's field of view and an indicia-decoding module configured for decoding indicia information within the indicia-capturing subsystem's field of view. The device also includes a hand-supportable housing, a battery compartment, an end cap for holding the battery compartment in place, and a locking mechanism for securing the end cap to the battery compartment during use.

20 Claims, 7 Drawing Sheets

HANDHELD INDICIA READER HAVING LOCKING ENDCAP

CROSS-REFERENCE TO RELATED APPLICATIONS

The present application claims the benefit of U.S. patent application Ser. No. 14/520,707 for a Handheld Indicia Reader Having Locking Endcap filed Oct. 22, 2014 (and published Mar. 12, 2015 as U.S. Patent Publication No. 2015/0069130), now U.S. Pat. No. 9,183,426, which claims the benefit of U.S. patent application Ser. No. 14/023,762 for a Handheld Indicia Reader Having Locking Endcap filed Sep. 11, 2013, now U.S. Pat. No. 8,870,074. Each of the foregoing patent applications, patent publication, and patents is hereby incorporated by reference in its entirety.

FIELD OF THE INVENTION

The present invention relates generally to the field of indicia readers, such as barcode scanners. More specifically, the present invention relates to devices for securely locking an end cap of a handheld indicia reader to its battery compartment during use.

BACKGROUND

Indicia readers, such as barcode scanners, are typically configured to acquire information from indicia and then decode that information for use in data systems. Indicia-reading systems may embrace various kinds of devices used to read indicia, including handheld barcode scanners.

Indicia-reading systems, such as handheld barcode scanners, can be optimized through the application of human factors and ergonomics. Generally speaking, human factors and ergonomics is a discipline that focuses on those variables that affect the performance of individuals using devices. The discipline is applied to achieve highly usable devices.

If a device, such as a handheld bar code scanner, is not designed to achieve high usability in its environment, then errors and delays can occur, even during operation by skilled users. A device with a high level of usability accommodates users with a wide range of skill levels working under variable conditions, is less prone to user error, and requires less user training.

As one example, in battery powered devices it is desirable to be able to remove the battery for replacement or recharging. In the case of handheld scanning devices, for instance, an end cap may lock a battery in place when it is secured within the handle portion of the handheld scanner's housing, and the end cap may be removed in order to access the battery compartment and remove, recharge, and/or replace the battery when the device is not in use.

During use of a hand held scanner, or a similar battery powered device, the device is often jostled such that the battery is subject to motion within the battery compartment. As a result, if a conventional fastener (e.g., a conventional screw) is used to secure the end cap, over time the jostling of the device may loosen the fastener securing the end cap. Accordingly, the use of conventional fasteners that are easily removable creates problems because the ability to properly secure the end cap is dependent upon proper torque being applied to prevent the end cap from loosening. In this regard, the strength of the operator may have a significant impact on the ability for the fastener to remain secure during use.

Therefore, a need exists for improved devices and for securing an end cap of a handheld battery powered device, such as a handheld scanner, to the battery compartment of the device so that the end cap will not become unsecured during use. More particularly, there exists a need for a highly usable device that locks a battery compartment in place when it is secured within the handle portion of a handheld battery powered device such as a handheld indicia reader (e.g., a handheld scanner).

SUMMARY

Accordingly, in one aspect, the present invention embraces an indicia-reading device (i.e., an indicia reader). The indicia reader has an indicia-capturing subsystem for acquiring information about indicia within the subsystem's field of view. The indicia reader also has an indicia-decoding module, which includes a signal processor, for decoding indicia information. The indicia reader has a hand-supportable housing enclosing the indicia-capturing subsystem and the indicia-decoding module. The hand-supportable housing includes an integral battery compartment and a removable end cap that secures the battery compartment and battery in place. The end cap includes a recessed portion and a keyhole that is within the recessed portion. The indicia reader also includes a rotatable locking mechanism that is used to secure the end cap to the battery compartment. The rotatable locking mechanism includes a longitudinal blade that engages the end cap's keyhole, and a head bow positioned on top of the blade. The rotatable locking mechanism also includes a clip for restricting rotation of the locking mechanism when the clip is in a locked position. Conversely, the clip permits rotation of the rotatable locking mechanism within the end cap's recessed portion when the clip is in an unlocked position. The clip is affixed to the rotatable locking mechanism's head bow. When the rotatable locking mechanism is engaged in the end cap, the end cap's recessed portion accommodates the clip in its locked position. As measured from the center of the end cap's keyhole, the end cap's recessed portion has a minimum radius $r_{recess-min}$. As measured from the axis of the locking mechanism's blade, the rotatable locking mechanism's clip has a radius $r_{up-max}$ when unlocked, a radius $r_{down-max}$ when locked, and $r_{up-max} < r_{recess-min} < r_{down-max}$.

In an exemplary embodiment, a complete rotation of the rotatable locking mechanism is permitted when the rotatable locking mechanism's clip is in an unlocked position.

In another exemplary embodiment, complete rotation of the rotatable locking mechanism is prevented when the rotatable locking mechanism's clip is in a locked position.

In yet another exemplary embodiment, rotation of the rotatable locking mechanism is restricted to less than 30 degrees when the rotatable locking mechanism's clip is in a locked position.

In yet another exemplary embodiment, the rotatable locking mechanism's clip allows for hand rotation of the rotatable locking mechanism when the rotatable locking mechanism's clip is in an unlocked position.

In yet another exemplary embodiment, the rotatable locking mechanism's head bow includes a frictional interference slot that engages the rotatable locking mechanism's clip in the unlocked position allowing for hand rotation of the rotatable locking mechanism when the rotatable locking mechanism's clip is in an unlocked position.

In yet another exemplary embodiment, the indicia-reading device is a handheld scanner.

In yet another exemplary embodiment, the integral battery compartment is positioned within a base portion of the hand-supportable housing.

In yet another exemplary embodiment, the rotatable locking mechanism is a captive screw.

In yet another exemplary embodiment, the indicia-reading device is battery powered.

In yet another exemplary embodiment, the battery is a rechargeable battery.

In yet another exemplary embodiment, the rotatable locking mechanism's blade has a threaded portion.

In another aspect, the present invention embraces an indicia-reading device (i.e., an indicia reader) that has an indicia-capturing subsystem for acquiring information about indicia within the subsystem's field of view. The indicia reader also has an indicia-decoding module, which includes a signal processor, for decoding indicia information. The indicia reader has a hand-supportable housing that encloses the indicia-capturing subsystem and the indicia-decoding module. The hand-supportable housing includes an integral battery compartment and a removable end cap that secures the battery compartment and batter in place. The end cap includes a recessed portion and a keyhole that is within the end cap's recessed portion. The indicia reader also includes a rotatable locking mechanism that is used to secure the end cap to the battery compartment. The rotatable locking mechanism includes a longitudinal blade that engages the end cap's keyhole and a head bow positioned on top of the rotatable locking mechanism's longitudinal blade. The rotatable locking mechanism also includes a clip for restricting the rotation of the rotatable locking mechanism when the clip is in a locked position. Conversely, the clip permits rotation of the rotatable locking mechanism within the end cap's recessed portion when the clip is in an unlocked position. The clip is affixed to the rotatable locking mechanism's head bow. When the rotatable locking mechanism is engaged in the end cap, the end cap's recessed portion accommodates the clip in its locked position. As measured from the center of the end cap's keyhole, the end cap's recessed portion has a minimum radius $r_{recess-min}$. As measured from the axis of the locking mechanism's blade, the rotatable locking mechanism's clip has a radius $r_{up-max}$ when unlocked, a radius $r_{down-max}$ when locked, and $r_{up-max} < r_{recess-min} < r_{down-max}$. The rotatable locking mechanism's head bow includes a frictional interference lip for engaging the rotatable locking mechanism's clip in the locked position. A complete rotation of the rotatable locking mechanism is permitted when the rotatable locking mechanism's clip is in an unlocked position. Conversely, complete rotation of the rotatable locking mechanism is prevented when the rotatable locking mechanism's clip is in a locked position.

In another exemplary embodiment, rotation of the rotatable locking mechanism is restricted to less than 50 degrees when the rotatable locking mechanism's clip is in a locked position.

In yet another exemplary embodiment, the rotatable locking mechanism's clip allows for hand rotation of the rotatable locking mechanism when the rotatable locking mechanism's clip is in an unlocked position.

In yet another exemplary embodiment, the rotatable locking mechanism's head bow includes a frictional interference slot for engaging the rotatable locking mechanism's clip in the unlocked position that facilitates hand rotation of the rotatable locking mechanism.

In yet another exemplary embodiment, the indicia-reading device is a handheld scanner.

In yet another exemplary embodiment, the rotatable locking mechanism is a captive screw.

In yet another exemplary embodiment, the rotatable locking mechanism's blade includes a threaded portion.

In yet another exemplary embodiment, the battery is a rechargeable battery.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces indicia readers. In particular, the present invention embraces handheld indicia readers, such as handheld scanners, having a locking end cap that secures the battery compartment and battery of the indicia reader in place during use and that allows for removal of the battery compartment in order to access, remove, and replace/recharge the battery when the device is not in use.

The term "indicia" is intended to refer broadly to various kinds of machine-readable indicia, including barcodes, QR codes, matrix codes, 1D codes, 2D codes, RFID tags, characters, etc. The indicia are typically graphical representations of information (e.g., data), such as product numbers, package tracking numbers, or personnel identification numbers. The use of indicia readers to input data into a system, rather than manual data entry, results in generally faster and more reliable data entry.

Figure 1:
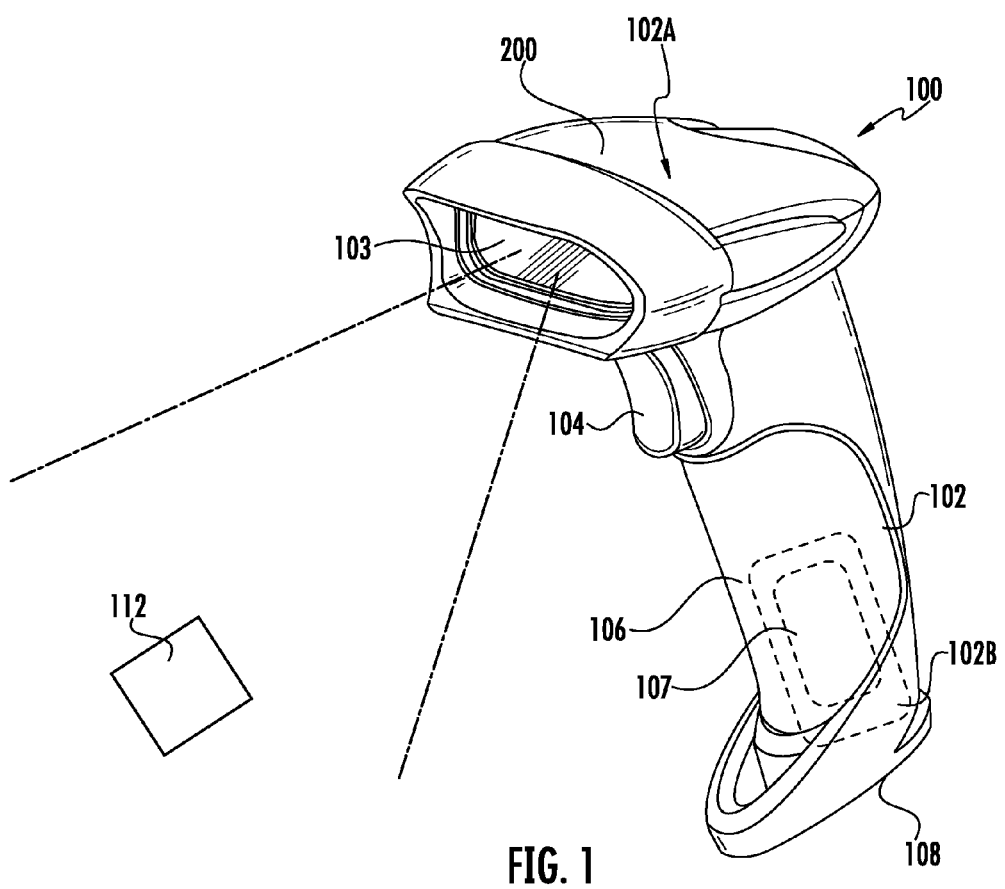
FIG. 1 depicts a perspective view of an exemplary indicia reader.

Referring now to the drawings, FIG. 1 depicts an exemplary indicia-reading device according to the present invention, in this case a handheld scanner (100). The exemplary handheld scanner (100) includes a hand-supportable housing (102).

The housing (102) has a head portion (102A) that is provided with a light transmission window (103) integrated within the head portion (102A) of the housing (102). The light transmission window (103) may include a laser (e.g., infrared) or an image reading sensor that is utilized for reading symbols, images, and the like. As illustrated in FIG. 1, a manually-actuated trigger switch (104) may be utilized to activate an indicia capturing system (200) (as depicted via schematic diagram at FIG. 2).

Figure 2:
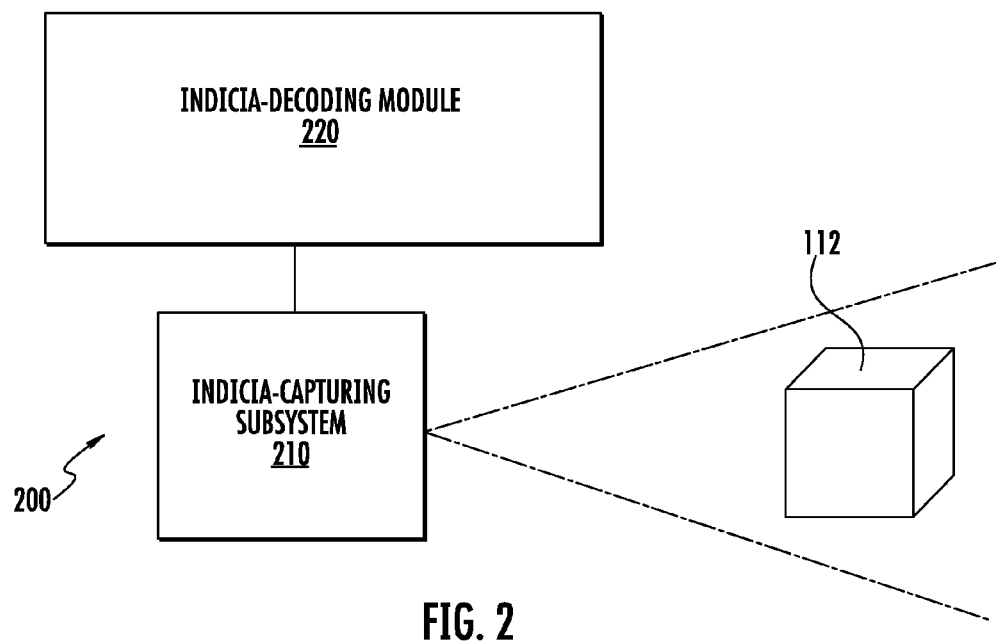
FIG. 2 illustrates, via a schematic block diagram, an exemplary indicia capturing system.

The exemplary indicia reader, in this case a handheld scanner (100), includes an indicia-capturing system (200) that includes an indicia-capturing subsystem (210), as depicted at FIG. 2. The indicia-capturing subsystem (210) acquires information about indicia within the indicia-capturing subsystem's (210) field of view. Typically, an object (112) that bears an indicium may be placed within the field of view of the indicia-capturing subsystem (210). Alternatively, the indicia-capturing subsystem (210) may be manipulated to reposition the field of view to include the object (112) bearing the indicium.

In some instances, the indicia-capturing subsystem (210) may be a laser scanning subsystem that sweeps a light beam (e.g., a laser beam) across the field of view and then receives the optical signals that reflect or scatter off the indicium. Typically, the optical signal is received using a photoreceptor (e.g., photodiode) and is converted into an electrical signal. The electrical signal is an electronic representation of the indicia information (e.g., the data represented by the indicia). When in the form of an electrical signal, this information can be processed (e.g., decoded) by the indicia-capturing system (200). References contained herein to electrical signals are intended broadly to also encompass digital images capable of being electronically processed (e.g., an image-processing computer processor).

As shown in FIG. 2, the indicia-reading system (200) may also include an indicia-decoding module (220). The indicia-decoding module (220) is configured to decode indicia information (e.g., electrical signal or digital image) acquired by the indicia-capturing subsystem (210).

As shown in FIG. 1, the exemplary hand-supportable scanner's housing (102) may include a base portion (102B). The base portion (102B) includes an internal battery compartment (106) that may contain a removable power source, such as a rechargeable battery (107), for powering the exemplary hand-supportable scanner (100).

Figure 3:
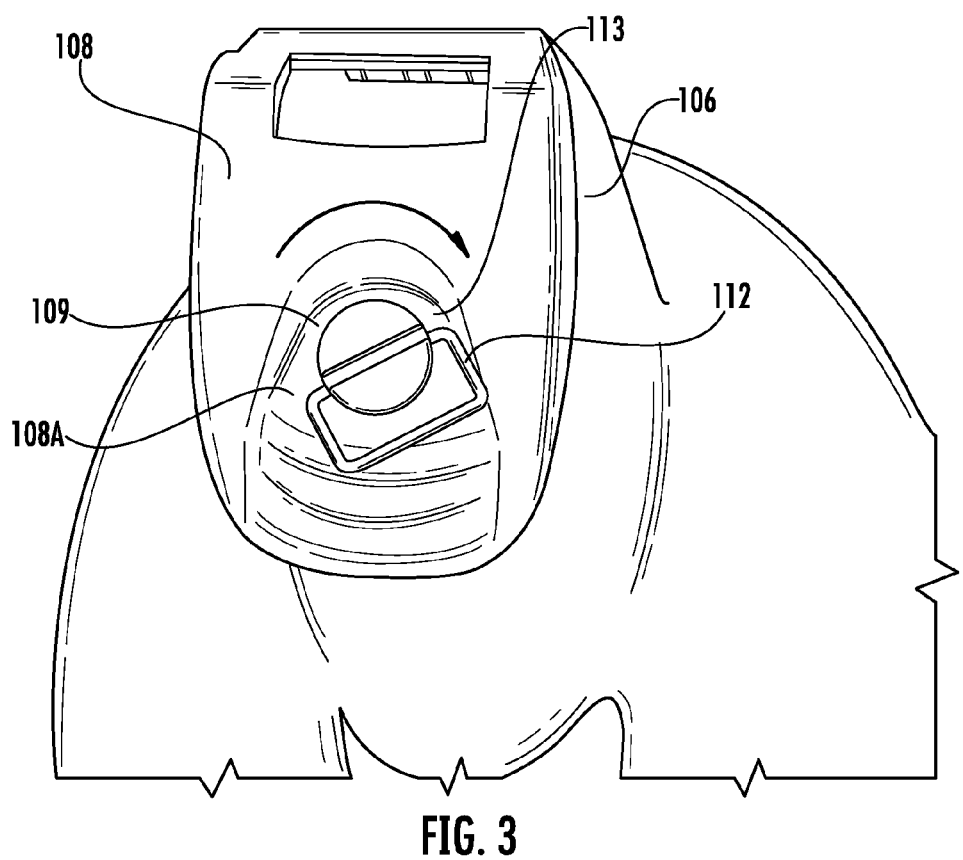
FIG. 3 depicts a bottom view of an exemplary indicia reader.

The end cap (108), which includes a recessed portion (108A), engages the battery compartment (106) (FIG. 1 and FIG. 3). The locking mechanism (109) is positioned within the recessed portion (108A). Locking mechanism (109), which is used for locking the battery compartment (106), secures the end cap (108) to the battery compartment (106) when engaged within the recessed portion of the end cap (108A). Conversely, locking mechanism (109) may be disengaged in order to remove the end cap (108), access the battery compartment (106), and remove and charge the battery (107).

Figure 4:
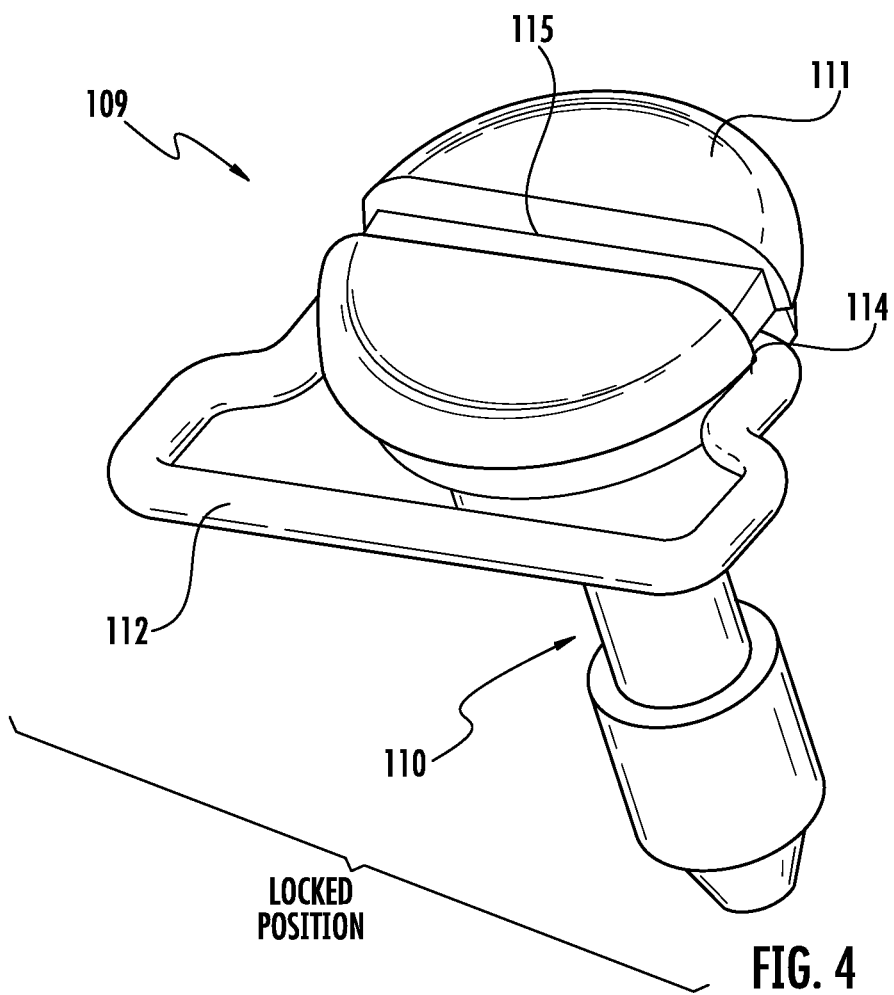
FIG. 4 depicts a perspective view of an exemplary locking mechanism in a down or "locked" position.
Figure 5:
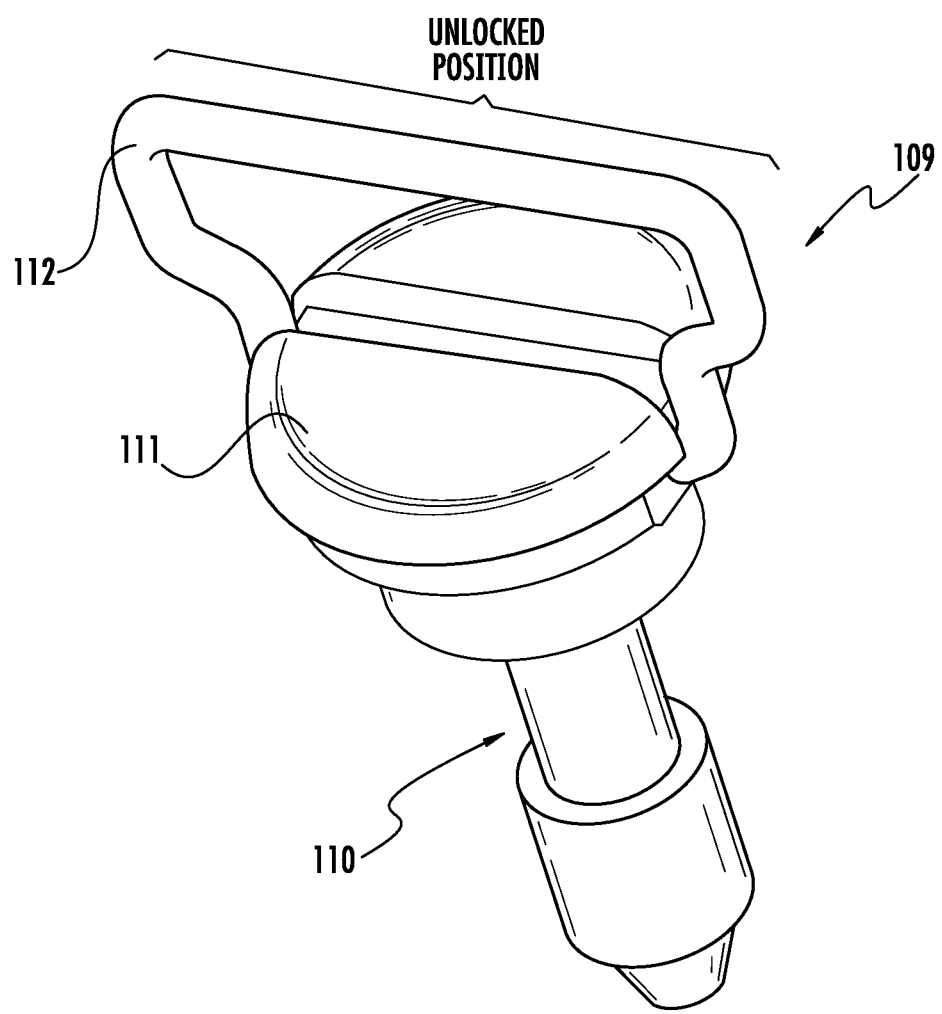
FIG. 5 depicts a perspective view of an exemplary locking mechanism in an up or "unlocked" position.
Figure 6:
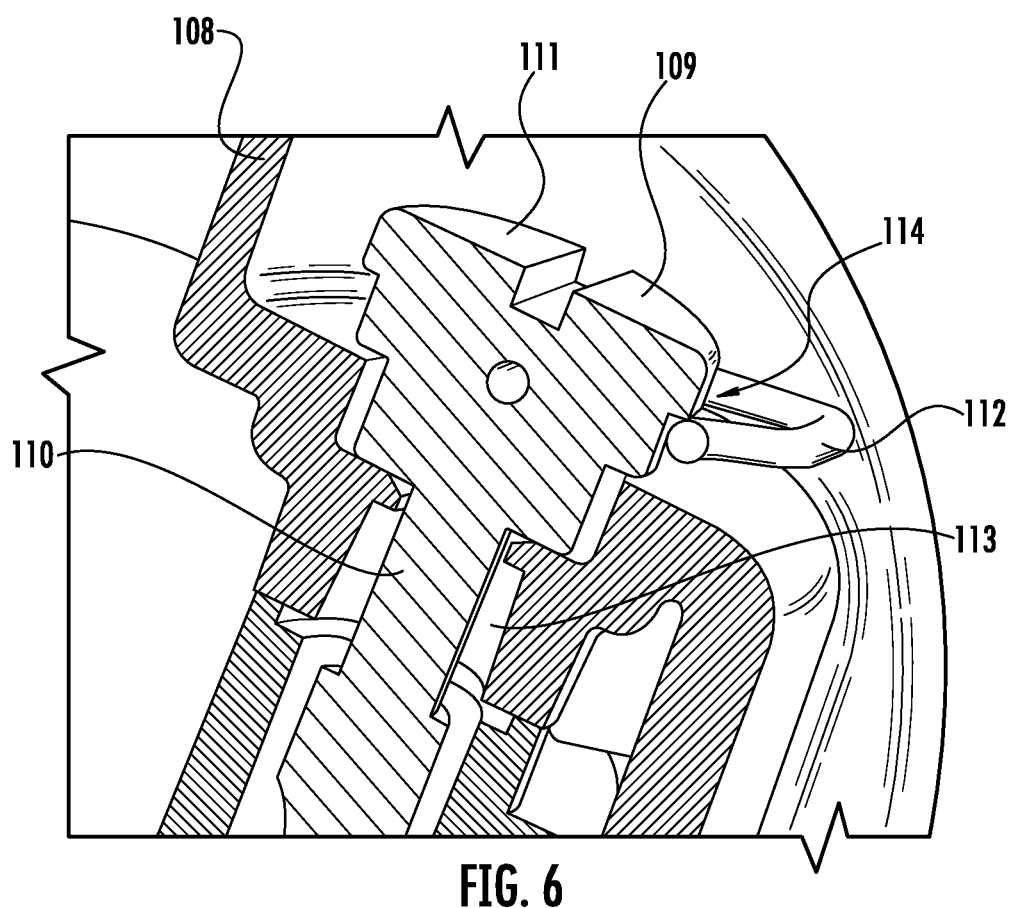
FIG. 6 depicts a cross-sectional view of an exemplary locking mechanism positioned within an exemplary end cap.

Exemplary locking mechanism (109) is depicted standing alone at FIGS. 4 and 5, and in a cross-sectional view positioned within the end cap (108) at FIG. 6. The exemplary locking mechanism (109) is rotatable and includes a longitudinal blade (110) for inserting into and engaging the hand supportable housing (102) within the end cap's keyhole (113), which extends internally into the end cap (108) (FIG. 6). The exemplary locking mechanism (109) includes a head bow (111)—the head portion of the locking mechanism which is left protruding from the end cap (108)—for positioning the rotatable locking mechanism's blade (110) within the end cap's keyhole (113).

As depicted at FIG. 6, the exemplary locking mechanism (109) is in the form of a captive screw that secures the end cap (108) to the battery compartment (106) when engaged but that cannot be separated from the end cap (108) when disengaged. The captive screw provides added usability for the exemplary handheld scanner (100) such that the locking mechanism (109) cannot be misplaced or lost when the end cap (108) is disengaged from the battery compartment (106). Although a captive screw as depicted at FIG. 6 is described, those having skill in the art will appreciate that various other fasteners (e.g. threaded screws, bolts, flanges, pins, quarter turn fasteners, etc.) may otherwise be utilized as a locking mechanism.

The exemplary locking mechanism (109) includes a clip (112) that restricts the rotation of the rotatable locking mechanism (109) within the end cap's recessed portion (108A) when the clip (112) is in a down, locked position as depicted at FIGS. 3 and 4. Conversely, as depicted at FIG. 5, the locking mechanism's clip (112) permits rotation of the rotatable locking mechanism (109) within the end cap's recessed portion (108A) when the clip (112) is in an upward, unlocked position. The clip (112), when in an upward, unlocked position, provides added usability in that it allows a user to apply additional leverage to secure and unsecure the locking mechanism (109) without the use of an additional or external tool. The frictional interference slot (115) engages the rotatable locking mechanism's clip (112) in the unlocked position, further facilitating hand rotation of the rotatable locking mechanism (109) when the rotatable locking mechanism's clip (112) is in an unlocked position.

As depicted in FIGS. 4 and 6, the exemplary rotatable locking mechanism's head bow (111) may include a frictional interference lip (114) for engaging the rotatable locking mechanism's clip (112) in the downward, locked position. In this regard, application of additional force would be required to disengage the rotatable locking mechanism's clip (112) from the locked position to an unlocked position, as shown in FIG. 5.

As shown in FIGS. 3 and 6, when the longitudinal blade (110) is engaged with the end cap's keyhole (113), and the rotatable locking mechanism (109) is in the locked position in the recessed portion (108A) of the end cap (108), the end cap is secured to the battery compartment (106).

As shown in FIG. 3, the exemplary end cap's recessed portion (108A) is configured to accommodate the rotatable locking mechanism's clip (112) in its downward, locked position. Because of its position within the recessed portion (108A), complete rotation of the rotatable locking mechanism (109) is prevented when the rotatable locking mechanism's clip (112) is in a locked position. Generally, rotation of the rotatable locking mechanism (109) may be restricted to less than 90 degrees (e.g., 75 degrees or less) when the rotatable locking mechanism's clip (112) is in a locked position. In some embodiments, the rotation of the rotatable locking mechanism (109) may be restricted to less than 60 degrees (e.g., 45 degrees or less), such as less than 30 degrees (e.g., 25 degrees or less).

In this regard, the rotatable locking mechanism (109) effectively secures the end cap (108) as long as a complete rotation of the rotatable locking mechanism (109) is prevented such that the end cap (108) does not become unsecured when the clip (112) is in a locked position.

Figure 7:
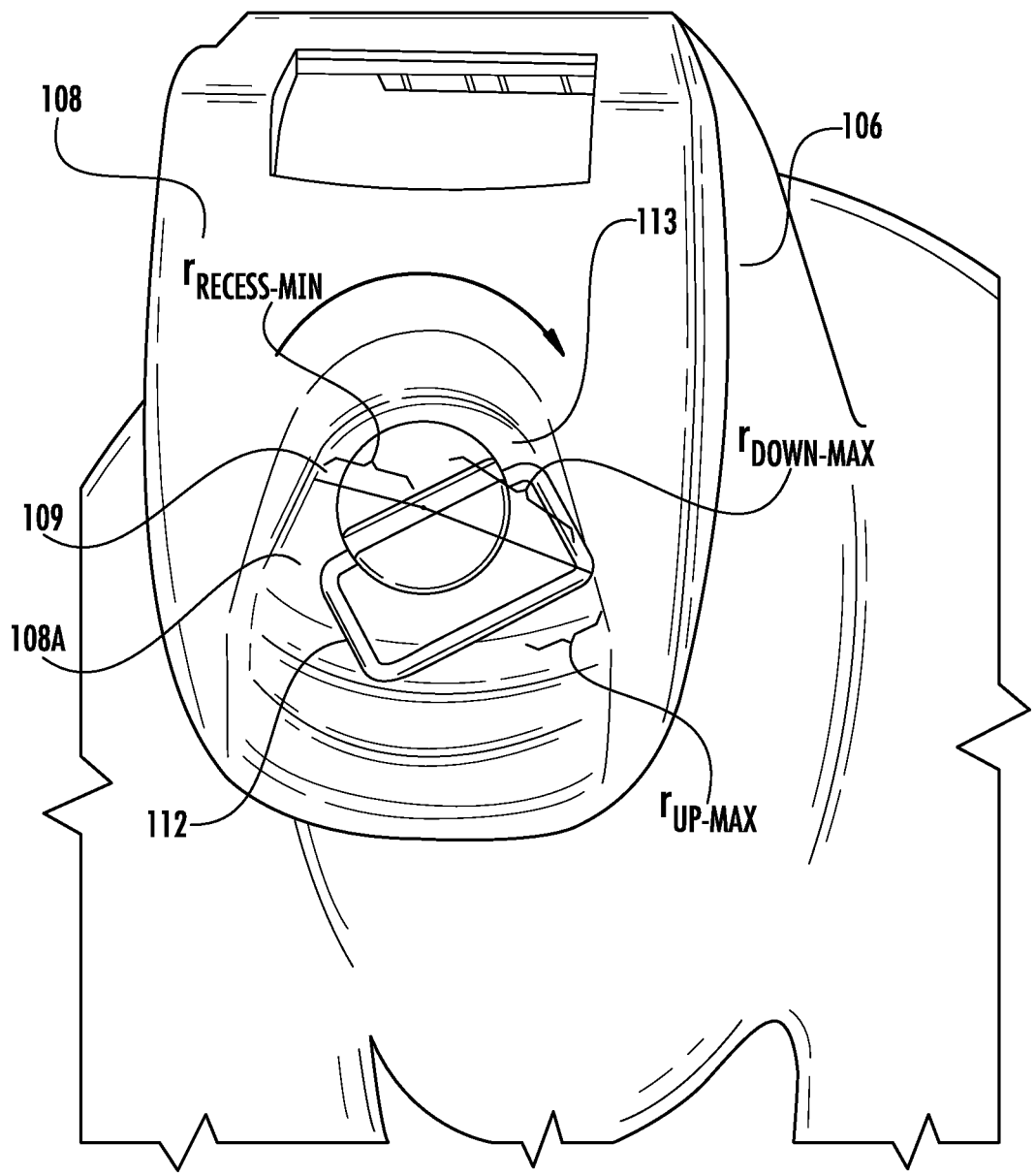
FIG. 7 depicts a bottom view of an exemplary indicia reader.

In FIG. 7, a bottom view of an exemplary indicia reader is shown with the locking mechanism's clip (112) in the downward, locked position. As measured from the center of the end cap's keyhole (113), the end cap's recessed portion has a minimum radius $r_{recess-min}$. As measured with respect to the axis defined by the rotatable locking mechanism's blade, the rotatable locking mechanism's clip (112) has a maximum radius $r_{up-max}$ when unlocked and a maximum radius $r_{down-max}$ when locked. In order to prevent complete rotation of the locking mechanism (109) when the rotatable locking mechanism's clip (112) is in a locked position, and conversely to allow for rotation of the rotatable locking mechanism (109) when it is in a unlocked position, the relationship for the respective radii is defined as follows: $r_{up-max} < r_{recess-min} < r_{down-max}$.

The clip (112) and recessed portion (108A) are not limited to the exemplary embodiments disclosed and may have a wide-range of complementary configurations (e.g. circular, triangular, quadrilateral, etc.) that prevent complete rotation of the locking mechanism (109) when the rotatable locking mechanism's clip (112) is in a locked position, and conversely that allow for rotation of the rotatable locking mechanism (109) when it is in an unlocked position.

To supplement the present disclosure, this application incorporates entirely by reference the following patents, patent application publications, and patent applications: U.S. Pat. No. 6,832,725; U.S. Pat. No. 7,159,783; U.S. Pat. No. 7,128,266; U.S. Pat. No. 7,413,127; U.S. Pat. No. 7,726,575; U.S. Pat. No. 8,390,909; U.S. Pat. No. 8,294,969; U.S. Pat. No. 8,408,469; U.S. Pat. No. 8,408,468; U.S. Pat. No. 8,381,979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Pat. No. 8,457,013; U.S. Pat. No. 8,448,863; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Pat. No. 8,517,271; U.S. Pat. No. 8,523,076; U.S. Pat. No. 8,528,819; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. Patent Application Publication No. 2013/0175343; U.S. patent application Ser. No. 13/347,193 for a Hybrid-Type Bioptical Laser Scanning And Digital Imaging System Employing Digital Imager With Field Of View Overlapping Field Of Field Of Laser Scanning Subsystem, filed Jan. 10, 2012 (Kearney et al.); U.S. patent application Ser. No. 13/367,047 for Laser Scanning Modules Embodying Silicone Scan Element With Torsional Hinges, filed Feb. 6, 2012 (Feng et al.); U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz); U.S. patent application Ser. No. 13/432,197 for a Laser Scanning System Using Laser Beam Sources For Producing Long And Short Wavelengths In Combination With Beam-Waist Extending Optics To Extend The Depth Of Field Thereof While Resolving High Resolution Bar Code Symbols Having Minimum Code Element Widths, filed Mar. 28, 2012 (Havens et al.); U.S. patent application Ser. No. 13/492,883 for a Laser Scanning Module With Rotatably Adjustable Laser Scanning Assembly, filed Jun. 10, 2012 (Hennick et al.); U.S. patent application Ser. No. 13/367,978 for a Laser Scanning Module Employing An Elastomeric U-Hinge Based Laser Scanning Assembly, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); U.S. patent application Ser. No. 13/902,110 for a System and Method for Display of Information Using a Vehicle-Mount Computer, filed May 24, 2013 (Hollifield); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); U.S. patent application Ser. No. 13/930,913 for a Mobile Device Having an Improved User Interface for Reading Code Symbols, filed Jun. 28, 2013 (Gelay et al.); U.S. patent application Ser. No. 13/933,415 for an Electronic Device Case, filed Jul. 2, 2013 (London et al.); U.S. patent application Ser. No. 13/947,296 for a System and Method for Selectively Reading Code Symbols, filed Jul. 22, 2013 (Rueblinger et al.); U.S. patent application Ser. No. 13/950,544 for a Code Symbol Reading System Having Adjustable Object Detection, filed Jul. 25, 2013 (Jiang); U.S. patent application Ser. No. 13/961,408 for a Method for Manufacturing Laser Scanners, filed Aug. 7, 2013 (Saber et al.); U.S. patent application Ser. No. 13/973,315 for a Symbol Reading System Having Predictive Diagnostics, filed Aug. 22, 2013 (Nahill et al.); U.S. patent application Ser. No. 13/973,354 for a Pairing Method for Wireless Scanner via RFID, filed Aug. 22, 2013 (Wu et al.); U.S. patent application Ser. No. 13/974,374 for Authenticating Parcel Consignees with Indicia Decoding Devices, filed Aug. 23, 2013 (Ye et al.); U.S. patent application Ser. No. 14/018,729 for a Method for Operating a Laser Scanner, filed Sep. 5, 2013 (Feng et al.); and U.S. patent application Ser. No. 14/019,616 for a Device Having Light Source to Reduce Surface Pathogens, filed Sep. 6, 2013 (Todeschini).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An indicia-reading device, comprising:
an indicia-capturing subsystem; and
a housing substantially enclosing the indicia-capturing subsystem, the housing including (i) an integral battery compartment, (ii) an end cap removably engaging the battery compartment, the end cap defining a recessed portion and a keyhole within the end cap's recessed portion, and (iii) a rotatable locking mechanism for securing the end cap to the battery compartment;
wherein the rotatable locking mechanism comprises (i) a longitudinal blade for engaging the end cap's keyhole, the longitudinal blade defining an axis, (ii) a head bow for positioning the longitudinal blade within the end cap's keyhole, the head bow contiguously positioned atop the longitudinal blade, and (iii) a clip for rotatably restricting rotation of the rotatable locking mechanism within the end cap's recessed portion when the clip is in a locked position and permitting rotation of the rotatable locking mechanism within the end cap's recessed portion when the clip is in a unlocked position, the clip attached to the head bow;
wherein, when the rotatable locking mechanism is engaged in the end cap to thereby secure the end cap to the battery compartment, the end cap's recessed portion is configured to accommodate the rotatable locking mechanism's clip in its locked position;
wherein, as measured from the center of the end cap's keyhole, the end cap's recessed portion has a minimum radius $r_{recess\text{-}min}$;
wherein, as measured with respect to the axis defined by the longitudinal blade, the rotatable locking mechanism's clip has a radius $r_{up\text{-}max}$ when unlocked and a radius $r_{down\text{-}max}$ when locked; and wherein $r_{up\text{-}max} < r_{recess\text{-}min} < r_{down\text{-}max}$.

2. The indicia-reading device according to claim 1, wherein substantially complete rotation of the rotatable locking mechanism is permitted when the rotatable locking mechanism's clip is in an unlocked position.

3. The indicia-reading device according to claim 1, wherein complete rotation of the rotatable locking mechanism is prevented when the rotatable locking mechanism's clip is in a locked position.

4. The indicia-reading device according to claim 1, wherein rotation of the rotatable locking mechanism is restricted to less than 30 degrees when the rotatable locking mechanism's clip is in a locked position.

5. The indicia-reading device according to claim 1, wherein the rotatable locking mechanism's clip facilitates hand rotation of the rotatable locking mechanism when the rotatable locking mechanism's clip is in an unlocked position.

6. The indicia-reading device according to claim 1, wherein the rotatable locking mechanism's head bow includes a frictional interference slot for engaging the rotatable locking mechanism's clip in the unlocked position facilitating hand rotation of the rotatable locking mechanism when the rotatable locking mechanism's clip is in an unlocked position.

7. The indicia-reading device according to claim 1, wherein the indicia-reading device is a handheld scanner.

8. The indicia-reading device according to claim 7, wherein the integral battery compartment is positioned within a base portion of the housing.

9. The indicia-reading device according to claim 1, wherein the rotatable locking mechanism comprises a captive screw.

10. The indicia-reading device according to claim 1, wherein the indicia-reading device is battery powered.

11. The indicia-reading device according to claim 10, wherein the battery is a rechargeable battery.

12. The indicia-reading device according to claim 1, wherein the rotatable locking mechanism's longitudinal blade comprises a threaded portion.

13. An indicia-reading device, comprising:
an indicia-capturing subsystem; and
a housing substantially enclosing the indicia-capturing subsystem, the housing including (i) an integral battery compartment, (ii) an end cap removably engaging the battery compartment, the end cap defining a recessed portion and a keyhole within the end cap's recessed portion, and (iii) a rotatable locking mechanism for securing the end cap to the battery compartment;
wherein the rotatable locking mechanism comprises (i) a longitudinal blade for engaging the end cap's keyhole, the longitudinal blade defining an axis, (ii) a head bow for positioning the longitudinal blade within the end cap's keyhole, the head bow contiguously positioned atop the longitudinal blade, and (iii) a clip for rotatably restricting rotation of the rotatable locking mechanism within the end cap's recessed portion when the clip is in a locked position and permitting rotation of the rotatable locking mechanism within the end cap's recessed portion when the clip is in a unlocked position, the clip attached to the head bow;
wherein, when the rotatable locking mechanism is engaged in the end cap to thereby secure the end cap to the battery compartment, the end cap's recessed portion is configured to accommodate the rotatable locking mechanism's clip in its locked position;

wherein, as measured from the center of the end cap's keyhole, the end cap's recessed portion has a minimum radius $r_{recess-min}$;

wherein, as measured with respect to the axis defined by the rotatable locking mechanism's longitudinal blade, the rotatable locking mechanism's clip has a radius $r_{up-max}$ when unlocked and a radius $r_{down-max}$ when locked;

wherein $r_{up-max} < r_{recess-min} < r_{down-max}$;

wherein the rotatable locking mechanism's head bow includes a frictional interference lip for engaging the rotatable locking mechanism's clip in the locked position;

wherein substantially complete rotation of the rotatable locking mechanism is permitted when the rotatable locking mechanism's clip is in an unlocked position; and wherein complete rotation of the rotatable locking mechanism is prevented when the rotatable locking mechanism's clip is in a locked position.

14. The indicia-reading device according to claim 13, wherein rotation of the rotatable locking mechanism is restricted to less than 50 degrees when the rotatable locking mechanism's clip is in a locked position.

15. The indicia-reading device according to claim 13, wherein the rotatable locking mechanism's clip facilitates hand rotation of the rotatable locking mechanism when the rotatable locking mechanism's clip is in an unlocked position.

16. The indicia-reading device according to claim 13, wherein the rotatable locking mechanism's head bow includes a frictional interference slot for engaging the rotatable locking mechanism's clip in the unlocked position facilitating hand rotation of the rotatable locking mechanism when the rotatable locking mechanism's clip is in an unlocked position.

17. The indicia-reading device according to claim 13, wherein the indicia-reading device is a handheld scanner.

18. The indicia-reading device according to claim 13, wherein the rotatable locking mechanism comprises a captive screw.

19. The indicia-reading device according to claim 13, wherein the rotatable locking mechanism's longitudinal blade comprises a threaded portion.

20. The indicia-reading device according to claim 13, wherein the battery is a rechargeable battery.

* * * * *